United States Patent
Son et al.

(10) Patent No.: US 9,461,498 B2
(45) Date of Patent: Oct. 4, 2016

(54) METHOD AND SYSTEM FOR WIRELESS CHARGING IN A PORTABLE TERMINAL

(75) Inventors: In-Gu Son, Gyeongsangbuk-do (KR); Chang-Taek Kang, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 923 days.

(21) Appl. No.: 13/435,042

(22) Filed: Mar. 30, 2012

(65) Prior Publication Data

US 2012/0249051 A1 Oct. 4, 2012

(30) Foreign Application Priority Data

Mar. 30, 2011 (KR) .................. 10-2011-0029124

(51) Int. Cl.
    *H02J 7/00* (2006.01)
    *H02J 7/02* (2016.01)
(52) U.S. Cl.
    CPC ...................... *H02J 7/025* (2013.01)
(58) Field of Classification Search
    USPC .................................. 320/106, 108
    See application file for complete search history.

(56) References Cited

U.S. PATENT DOCUMENTS

| 6,184,651 B1* | 2/2001 | Fernandez et al. | 320/108 |
| 8,212,520 B2* | 7/2012 | Takada et al. | 320/108 |
| 2010/0188041 A1* | 7/2010 | Mizuo | 320/108 |
| 2011/0148356 A1* | 6/2011 | Lowenthal et al. | 320/109 |
| 2011/0210701 A1* | 9/2011 | Nakamura | 320/118 |

FOREIGN PATENT DOCUMENTS

WO    WO 2006/001557    *   1/2006

\* cited by examiner

*Primary Examiner* — Samuel Berhanu
(74) *Attorney, Agent, or Firm* — Cha & Reiter, LLC

(57) ABSTRACT

A method for wirelessly charging a portable terminal using a Radio Frequency (RF) is provided. A charging system detects one or more portable terminals within a predetermined area, and preferably requests information needed for charging to the one or more portable terminals via short-range communication, receives the information in response needed for charging from each of the one or more portable terminals. A portable terminal to be wirelessly charged from among the one or more portable terminals is selected, based on the received information needed for charging, and the charging system transmits a predetermined RF for charging to the selected portable terminal.

20 Claims, 3 Drawing Sheets

METHOD AND SYSTEM FOR WIRELESS CHARGING IN A PORTABLE TERMINAL

CLAIM OF PRIORITY

This application claims priority under 35 U.S.C. §119(a) to a Korean Patent Application filed in the Korean Intellectual Property Office on Mar. 30, 2011 and assigned Serial No. 10-2011-0029124, the contents of which are incorporated herein by reference in its entirety.

BACKGROUND OF THE INVENTION

1. Field of the Invention

The present invention relates to a portable terminal, and more particularly, to a method and system for wireless charging the battery in a portable terminal 2. Description of the Related Art Due to the development of various, convenient functions of tablet PCs such as Galaxy Tab, the i-Pad and smart phones, the proliferation of such portable terminals have been widespread.

In particular, the inclusion of cameras, data communications, and multimedia play functions in portable terminals coupled with decreased costs for such devices have caused their popularity to soar. However, the implementation of these types of functions rapidly consumes the battery power of the portable terminals, which were not originally designed for powering such a conglomeration of items. Therefore, it is desirable to permit a convenient re-charge of the battery of such portable terminals.

To meet the ever-increasing demand to recharge portable devices, a wireless charging technology for wirelessly charging the battery of a portable terminal was developed and this wireless charging technology has been implemented. The wireless charging technology obviates the need for a peripheral device and a power connection cable to charge a portable terminal, thereby increasing convenience to users.

However, the conventional wireless charging technology just permits wireless charging of a portable terminal which is not a user friendly process, without specifying a user-friendly wireless charging method for a portable terminal

SUMMARY OF THE INVENTION

Exemplary aspects of the present invention address at least some of the problems and/or disadvantages and to provide at least the advantages described below. Accordingly, an aspect of the present invention is to provide a method for enabling a user to wirelessly charge a portable terminal with a level of convenience unknown heretofore.

In accordance with an exemplary embodiment of the present invention, there is provided a method for wirelessly charging a portable terminal using a Radio Frequency (RF), in which a charging system detects one or more portable terminals within a predetermined area, requests information needed for (i.e. associated with) charging to the one or more portable terminals, receives the information associated with charging from each of the one or more portable terminals, selects a portable terminal to be wirelessly charged from among the one or more portable terminals based on the received information regarding charging requirements, and transmits a predetermined RF for charging to the selected portable terminal.

In accordance with another exemplary embodiment of the present invention, there is provided a system for wirelessly charging a portable terminal using an RF, in which a charging system detects one or more portable terminals within a predetermined area, requests information associated with charging to the one or more portable terminals, receives the information associated with charging from each of the one or more portable terminals, selects a portable terminal to be wirelessly charged from among the one or more portable terminals, based on the received information associated with charging, and transmits a predetermined RF for charging to the selected portable terminal, and the portable terminal notifies the charging system of the entry into the predetermined area, when entering the predetermined area, transmits the information associated with charging to the charging system, and charges a battery with the received RF.

BRIEF DESCRIPTION OF THE DRAWINGS

The above and other exemplary objects, features and advantages of certain illustrated embodiments of the present invention will become more apparent to a person of ordinary skill in the art from the following detailed description taken in conjunction with the accompanying drawings, in which.

Throughout the drawings, the same drawing reference numerals will be understood to refer to the same elements, features and structures.

DETAILED DESCRIPTION

Reference will now be made in detail to the preferred exemplary embodiments of the present invention with reference to the accompanying drawings. The following description is given only of components and/or operations required for a person of ordinary skill in the art to understand the present invention and the other background art will not be described so as not to obscure the subject matter of the present invention.

A portable terminal according to an exemplary embodiment of the present invention comprises a mobile electronic device. The term "portable terminal" used herein covers a broad range of terminals, including but in no way limited to a video phone, a mobile phone, a smart phone, an International Mobile Telecommunications (IMT)-2000 terminal, a Wideband Code Division Multiple Access (WCDMA) terminal, a Universal Mobile Telecommunication System (UMTS) terminal, a Personal Digital Assistant (PDA), a Portable Multimedia Player (PMP), a Digital Multimedia Broadcasting (DMB) terminal, a laptop computer, a tablet PC, etc., just to name some possibilities.

Figure 1:
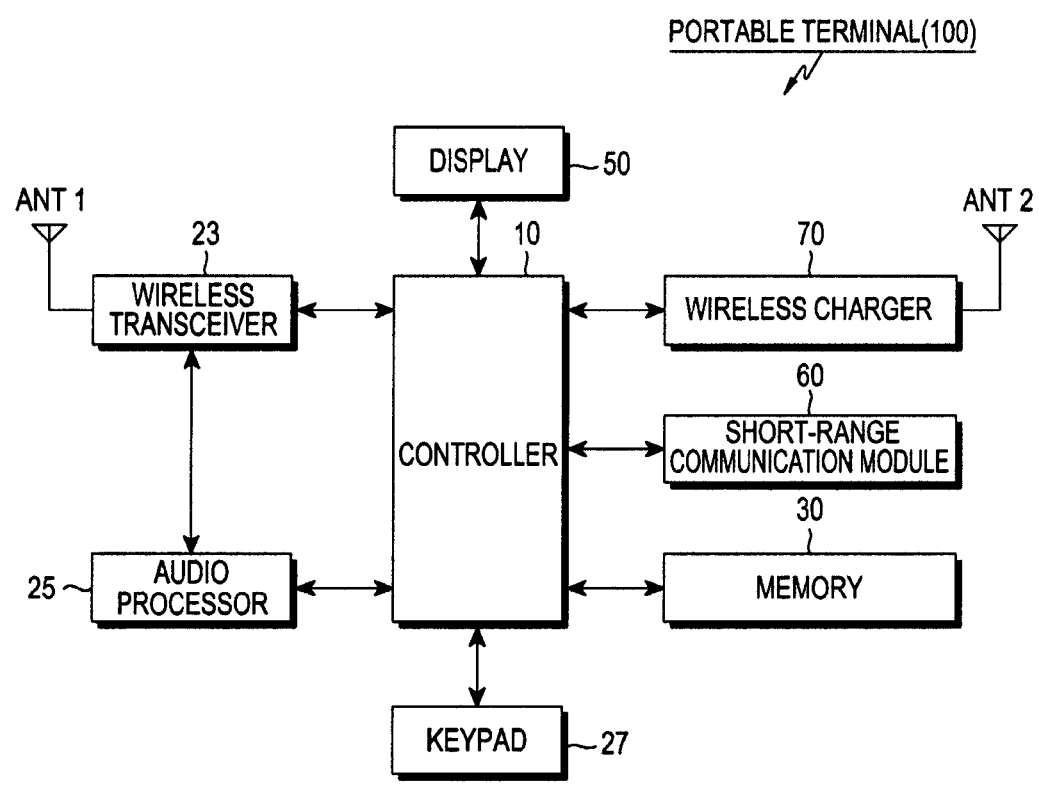
FIG. 1 is a block diagram of a portable terminal according to an exemplary embodiment of the present invention.

FIG. 1 is a block diagram of a portable terminal 100 according to an exemplary embodiment of the present invention. The portable terminal 100 preferably includes a controller 10, a wireless transceiver 23, an audio processor 25, a keypad 27, a memory 30, a display 50, a short-range communication module 60, and a wireless charger 70.

While the portable terminal shown in FIG. 1 does not have components such as a Global Positioning System (GPS) module, an acceleration sensor, a proximity sensor, a geomagnetic sensor, a DMB receiver, and a camera module, it is clearly understood to those skilled in the art that they may be included in the portable terminal according to the present invention and provide their own functions. For example, the acceleration sensor (not shown) senses the movement state of the portable terminal by measuring dynamic force such as acceleration, vibration, impact, etc. The display direction of the display 50 of the portable terminal 100 may be detected based on the sensed movement state of the portable terminal 100. The proximity sensor (not shown) senses approach of a user's body part toward the portable terminal 100. The sensed information of the proximity sensor may be used to prevent malfunction of the portable terminal 100, if the portable terminal 100 provides a touch screen function. A gyroscope (not shown) monitors dynamic rotation of the portable terminal 100. The gyroscope may be used in conjunction with the acceleration sensor in order to sense rotational motion of the portable terminal 100 along six axes, specifically up and down, back and forth, side by side, and x-, y- and z-axis rotations.

With reference to FIG. 1, the wireless transceiver 23 preferably includes a Radio Frequency (RF) unit and a MODEM. The RF unit preferably includes an RF transmitter for upconverting the frequency of a transmission signal and amplifying the upconverted signal and an RF receiver for low-noise-amplifying a received signal and downconverting the frequency of the low-noise-amplified signal. The MODEM preferably includes a transmitter for encoding and modulating the transmission signal and a receiver for demodulating and decoding the signal received from the RF unit.

The audio processor 25 shown in FIG. 1 may preferably include a Coder-Decoder (CODEC). The CODEC preferably includes a data CODEC and an audio CODEC. The data CODEC processes packet data and the audio CODEC processes an audio signal such as voice and a multimedia file. The audio processor 25 reproduces an audio signal by converting a digital audio signal received from the MODEM to an analog signal through the audio CODEC, or converts an analog audio signal generated from a microphone to a digital audio signal through the audio CODEC and transmits the digital audio signal to the MODEM. The CODEC may be configured separately or incorporated into the controller 10.

With continue reference to FIG. 1, the keypad 27 may include alphanumerical keys for entering digits and characters, function keys for setting functions, and a touch pad. If the display 50 is configured into a capacitive or resistive touch screen, the keypad 27 may be omitted or include a minimum number of keys. In this particular case, the display 50 may take charge of at least a part of key input functions if the display is a touchscreen.

The memory 30 may preferably include a program memory and data memories. The program memory stores programs for controlling regular operations of the portable terminal 100. The memory 30 may preferably include an external memory such as a Compact Flash (CF) memory card, a Secure Digital (SD) card, a micro-SD memory card, a mini-SD memory card, an eXtreme Digital (XD) card, and a memory stick. The memory 30 may also include other types of non-transitory mediums including a disk such as a Hard Disk Drive (HDD) and a Solid State Disk (SSD). Optical storage may also be employed.

The display 50 displays various types of information generated in the portable terminal 100. The display 50 may be various types of displays such as a Liquid Crystal Display (LCD), an Organic Light Emitting Diode (OLED) display (e.g. a Passive Matrix OLED (PMOLED) or Active Matrix OLED (AMOLED) display), or any type of Thin Film Technology screen, etc. The display 50 may also preferably include a touch screen (e.g. resistive, capacitive, etc.) that can be used not only as an output device but also as an input device along with or instead of the keypad 27.

With continued reference to FIG. 1, the short-range communication module 60 enables short-range wireless network communication. The short-range communication module 60 may preferably include at least one of a ZigBee module, an Ultra Wide Band (UWB) module, a Bluetooth module, a Near Field Communication (NFC) module, or a Wireless Fidelity (Wi-Fi) module. In accordance with an exemplary embodiment of the present invention, the short-range communication module 60 may notify a predetermined system of entry of the portable terminal 100 into a specific area (e.g. a wireless chargeable area) by a predetermined signal (e.g. a beacon signal). In this particular case, the short-range communication module 60 may be configured into an NFC module.

The wireless charger 70 charges a battery (not shown) of the portable terminal by converting a predetermined RF received from the predetermined wireless charging system (e.g. a charging system 200) to power. The charged battery supplies an operating power to the portable terminal 100. It is preferable that the RF used for the wireless charger 70 to charge the battery is different from an RF used in the wireless transceiver 23. Thus the portable terminal 100 can provide the user with a communication function through the wireless transceiver 23 and a wireless charging function through the wireless charger 70, using the different RFs. Meanwhile, a detailed structure of the wireless charger 70 in relation to wireless charging is known in the art and thus will not be described in detail herein.

The controller 10, which typically includes a microprocessor, provides overall control to the portable terminal 100. The controller 10 may switch one operation of the portable terminal 100 to another operation according to a user input received through the keypad 27 or via the display 50 and control the operations of the portable terminal 100. In accordance with the embodiment of the present invention, when the portable terminal 100 enters a specific area where wireless charging is available through the wireless charger 70 (e.g. a chargeable radius in FIG. 2), the controller 10 controls the charging system of the entry of the portable terminal 100 into the specific area through the short-range communication module 60 or the wireless transceiver 23. In addition, the controller 10 controls transmission of information associated with charging to the charging system 200 through the short-range communication module 60 or the wireless transceiver 23, in response to a request from the charging system 200. The controller 10 also controls the operation of the wireless charger 70 in order to charge the battery of the portable terminal 100 using an RF received from the charging system 200.

Figure 2:
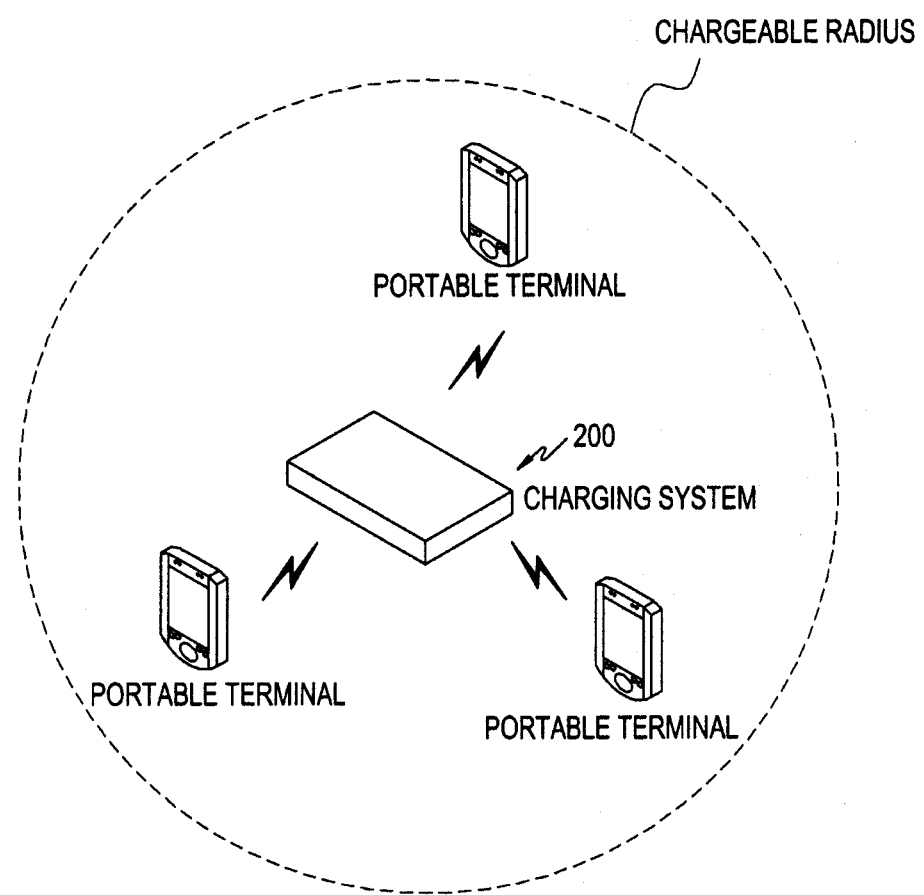
FIG. 2 is a virtual view illustrating a connection state between a charging system and portable terminals according to an exemplary embodiment of the present invention.

FIG. 2 is a virtual view illustrating a connection state between a charging system and portable terminals according to an exemplary embodiment of the present invention.

Referring now to FIG. 2, the charging system 200 preferably includes a multi-band RF transceiver for operating in a plurality of frequency bands. The charging system 200 provides an RF-based wireless charging function to a portable terminal within a chargeable distance, namely a chargeable radius. In one example, the wireless charger 70 (shown in FIG. 1) receives the transmission via antenna (ANT 2) from the charging system 200, provided that the portable terminals are within the chargeable radius.

The charging system 200 further includes an output level controller (not shown) for controlling the output level of an RF used to wireless charge a portable terminal Therefore, the charging system 200 may transmit an output level-controlled frequency (e.g. a frequency with an increased or decreased output level) by controlling the output level controller and the RF transceiver, thereby controlling the efficiency of wireless charging of a portable terminal For example, if an RF output level is increased, a portable terminal may charge its battery faster than at a lower RF output level. A detailed structure of the charging system 200 for providing a wireless charging function to portable terminals is also known in the art and thus will not be described herein.

Figure 3:
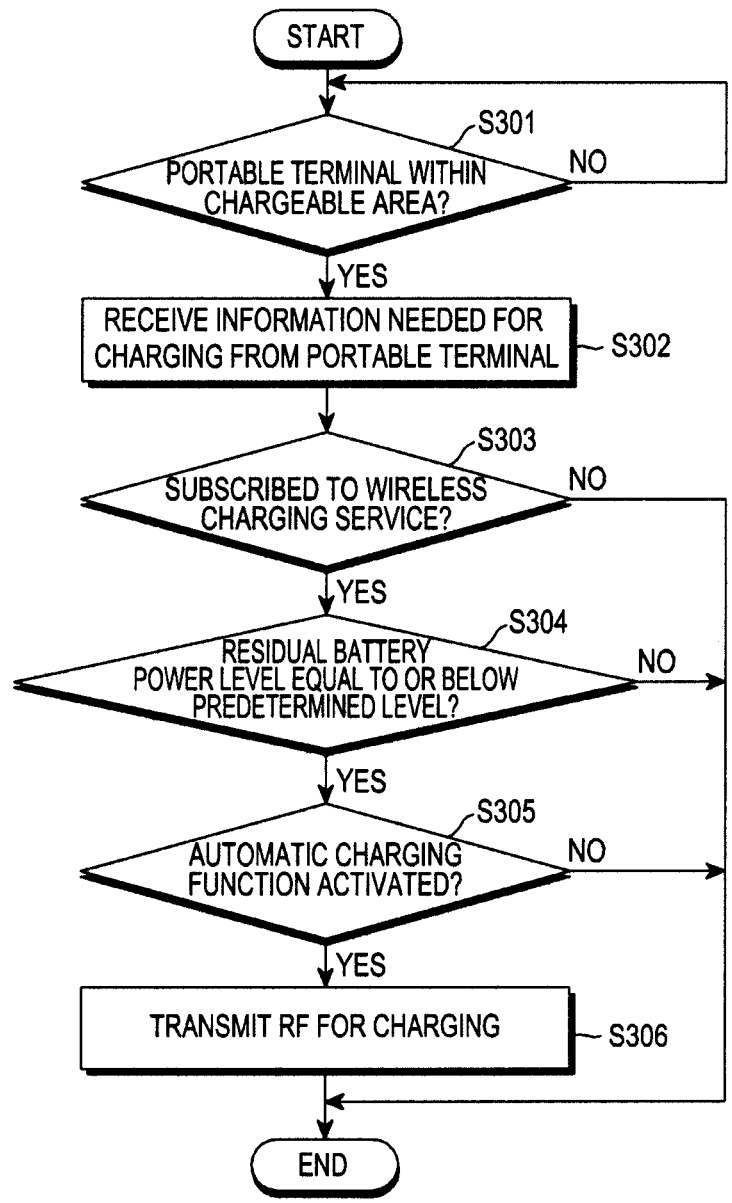
FIG. 3 is a flowchart illustrating an operation for wirelessly charging a portable terminal according to an exemplary embodiment of the present invention.

FIG. 3 is a flowchart illustrating an operation for wirelessly charging a portable terminal according to an exemplary embodiment of the present invention. The exemplary embodiment of the present invention will be described below with reference to FIGS. 1, 2 and 3.

Referring now to FIGS. 1, 2 and 3, at (S301) the charging system 200 determines whether a specific portable terminal has entered a wireless chargeable area.

As illustrated in FIG. 2, when the portable terminal enters the wireless chargeable area (e.g. the chargeable radius), the portable terminal may notify the charging system 200 of its entry into the chargeable radius by a specific signal (e.g. a beacon signal) through the short-range communication module 60. Thus, the charging system 200 may be aware of the presence of the portable terminal within the chargeable radius. In addition, instead of the short-range communication module 60, the portable terminal may notify the charging system 200 of its entry into the chargeable radius through the wireless transceiver 23.

In step S302, the charging system 200 requests the portable terminal to provide information associated with charging the portable terminal, and also receives the information from the portable terminal.

While the portable terminal is assumed to comprise a wirelessly chargeable in this exemplary embodiment of the present invention, some portable terminals may not have a wireless charging capability although they are situated within the wireless chargeable area, considering the performance of standard portable terminals that do not have wireless charging capability.

In addition, if the wireless charging service is membership-based, there can be one or more portable terminal being capable of wireless charging that is situated in the wireless chargeable area, but having not subscribed to the particular wireless charging service in the wireless chargeable area and thus cannot be wirelessly charged via the particular wireless charging service.

Accordingly, upon receipt of the information associated with wirelessly charging from the charging system 200, the portable terminal transmits at least one of information indicating whether the portable terminal is wireless charging-enabled, and/or subscription information regarding the wireless charging service.

The subscription information may contain information indicating whether the portable terminal is subscribed to the particular wireless charging service, and authentication information related to the wireless charging service (e.g. an Identifier (ID) and a password) and may include information about an RF channel used for wireless charging, if the portable terminal subscribed to the wireless charging service.

Furthermore, the portable terminal may transmit information indicating a residual battery power level in the information associated with charging in the exemplary embodiment of the present invention. Thus, the charging system 200 may determine the battery charge state (e.g. a residual battery power level) of the portable terminal based on information provided by the portable terminal. This information could affect, for example, the output level of the wireless charging from charging system 200 or a possible sequence of the portable terminals to receive such wireless charging.

In the exemplary embodiment of the present invention, the portable terminal may further transmit information indicating activation or deactivation of an automatic charging function that wirelessly charges the portable terminal without solicitation from the user, in the information associated with charging. Thus, the charging system 200 may determine whether the automatic charging function has been activated or not in the portable terminal In other words, upon receipt of a request for information associated with charging from the charging system 200, the portable terminal may transmit to the charging system 200 information indicating whether or not the portable terminal is wirelessly chargeable, subscription information regarding the wireless charging service, information indicating a residual battery power level, and information indicating whether or not the automatic charging function has been activated. The charging system 200 can preferably communicate with the short-range communication module 60 of the portable terminal 100, if said portable terminal is so equipped. Otherwise, the RF frequency of the wireless transceiver 23 can be used, if, for example, the portable terminal does not respond within a predetermined time (and/or predetermined number of retries) at the RF frequency of the short-range communication.

Upon receipt of the information associated with charging, the charging system 200 determines whether or not the portable terminal is wireless charging-enabled. If the charging system 200 determines that the portable terminal is wireless charging-enabled, the charging system 200 performs a wireless charging-related operation for the portable terminal in steps S303, S304 and S305.

In S303, S304 and S305, the charging system may determine based on the received information associated with charging whether or not the portable terminal subscribed to the wireless charging service, whether the residual battery power level of the portable terminal is equal to or lower than a predetermined level, or whether the automatic charging function has been activated for the portable terminal Then the charging system 200 determines whether or not to provide the wireless charging service to the portable terminal that has entered the wireless chargeable area and transmitted the information associated with charging in steps S303, S304 and S305.

For example, if the charging system 200 determines that the portable terminal has subscribed to the wireless charging service, and has a residual battery power level equal to or lower than a predetermined level (e.g. 50%), and is chargeable without a user's confirmation (e.g. a user's selection of an OK key for a displayed confirmation message) (e.g. the automatic charging function has been activated), the charging system 200 can determine to provide the wireless charging service to the portable terminal automatically.

While steps S303, S304 and S305 are used to determine whether to provide the wireless charging service to the portable terminal, all of the steps are not necessary. At least one of the steps may be performed to make the determination.

For example, if the wireless charging service is free-of-charge, only steps S304 and S305 may be performed to determine whether to provide the wireless charging service to the portable terminal.

However, if wireless charging is performed irrespective of a residual battery power level, only steps S303 and S305 may be performed to determine whether to provide the wireless charging service to the portable terminal.

Moreover, if the portable terminal is to be automatically charged wirelessly without a user's confirmation, that is, without activation of the automatic charging function, only steps S303 and S304 may be performed to determine whether to provide the wireless charging service to the portable terminal In addition, if step S303 is negative, the charging system can send an offer to the portable terminal to join the charging service, or pay for a one-time charge. Thus the charging system may provide payment information that is forwarded to a server for validation or processing of payment.

The user may determine whether or not to activate the automatic charging function by menu setting. The user may set the wireless charging so that the portable terminal can be wirelessly charged only with the user's confirmation (e.g. only upon input of an OK key) or automatically charged wirelessly without the user's confirmation (e.g. charging in a background state even though it is not noticed by the user). Even though the wireless charging is in progress in the background state, the progress of the wireless charging may be indicated to the user in the form of a predetermined icon displayed on an indicator bar of the display screen.

The exemplary embodiment of the present invention may be modified so that the determination is made as to whether to provide the wireless charging service to the portable terminal only in one of steps S303, S304 and S305. For example, the charging system 200 may determine to provide the wireless charging service to the portable terminal, only if it is determined that the portable terminal has a residual battery power level equal to or lower than a predetermined level in step S304.

Subsequently, at S306 the charging system 200 transmits an RF for wireless charging to the portable terminal As described above, once the charging system 200 determines to provide the wireless charging service to the portable terminal in at least one of steps S303, S304 and S305, the charging system transmits an RF for wireless charging to the determined (selected) portable terminal. Then the portable terminal can charge its battery with the received RF through the wireless charger 70.

All of the steps S303, S304 and S305 are not required according to alternative exemplary embodiments of the present invention, as previously stated. If step S304 is included in an exemplary embodiment of the present invention, a portable terminal with a residual battery power level equal to or lower than a predetermined level needs fast battery charging. In this case, the charging system may increase the output level of an RF set for wireless charging of the portable terminal and transmits the RF at the increased output level to the portable terminal. Therefore, the portable terminal can charge its battery faster with the RF at the increased output level.

As is apparent from the above description of the present invention, a user can wirelessly charge a portable terminal with convenience heretofore unknown.

When the residual battery power level of the portable terminal is equal to or lower than a predetermined level, the battery of the portable terminal can be charged wirelessly at a faster rate than a nominal rate by increasing the output level.

The above-described methods according to the present invention can be realized in hardware or as software or computer code that can be stored in a non-transitory recording medium such as, for example, a CD ROM, a DVD, a RAM, thumbnail drive, a floppy disk, a flash storage, a hard disk, or a magneto-optical disk or downloaded over a network, so that the methods described herein can be executed by such software using a general purpose computer, or a special processor, microprocessor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for wirelessly charging a portable terminal using a Radio Frequency (RF), the method comprising:
   detecting by a charging system one or more portable terminals within a predetermined chargeable area, requesting information associated with wireless charging to at least one of the one or more portable terminals, and receiving in response by the charging system the information associated with wireless charging from each said at least one or more portable terminals;
   selecting by the charging system at least one portable terminal to be wirelessly charged from among the at least one of the one or more portable terminals that responded to the previously-requested information, based on the received information, according to the determination result; and
   transmitting by the charging system an RF set for charging to the selected portable terminal, wherein an output level of the set RF is controlled based on the received information,
   wherein the information associated with charging includes subscription information regarding a wireless communication service the subscription information including at least one of information indicating whether the portable terminal is subscribed to a wireless charging service, authentication information related to the wireless charging service, and information about an RF channel used for wireless charging; and
   wherein when the portable terminal responds that there is no subscription to the wireless charging service, or the portable terminal is subscribed to a different wireless charging service, the charging system prompts the portable terminal to display an offer to subscribe to the charging service at least to receive one battery chare from the charging system.

2. The method of claim 1, wherein the information associated with charging includes battery information.

3. The method of claim 2, wherein the battery information includes a current storage level or a remaining capacity level.

4. The method of claim 1, wherein the information associated with charging includes information indicating whether the portable terminal is wirelessly chargeable.

5. The method of claim 1, wherein the information associated with charging includes information indicating whether or not an automatic charging function has been activated for the portable terminal.

6. The method of claim 1, wherein the offer is provided via a text message.

7. The method of claim 1, wherein the selecting by the charging system comprises selecting a portable terminal having a battery power level equal to or lower than a predetermined level from among the one or more portable terminals, based on the received information associated with charging.

8. The method of claim 7, wherein the transmitting of the RF by the charging system comprises increasing the output level of the RF for charging and transmitting the RF at the increased output level to the selected portable terminal in which a battery information provided to the charging system indicates that a battery power level of the selected portable terminal is equal to or lower than a predetermined level.

9. The method of claim 3, wherein the output level of the set RF is controlled to increase when the selected portable terminal has a battery power level equal to or lower than a predetermined level.

10. A system for wirelessly charging a portable terminal using a Radio Frequency (RF), the system comprising:
  a charging system that detects one or more portable terminals within a predetermined chargeable area, requests information associated with wirelessly charging to the one or more portable terminals, receives the information associated with charging from at least one of the one or more portable terminals, determines whether to provide the wireless charging to the one or more portable terminals or not, based on the received information associated with wireless charging, selects a portable terminal to be wirelessly charged from among the one or more portable terminals that previously responding to the charging system based on the received information associated with wirelessly charging the one or more portable terminals, according to determination result, and transmits an RF set for charging to the selected portable terminal, wherein an output level of the set RF is controlled based on the received information; and
  the portable terminal for, when entering the predetermined chargeable area, notifying the charging system of the entry into the predetermined chargeable area, transmitting to the charging system the information associated with wirelessly charging to the charging system, and charging a battery with the received RF,
  wherein the selected portable terminal has a battery power level equal to or lower than a predetermined level from among the one or more portable terminals, and
  wherein when the portable terminal responds that there is no subscription to a wireless charging service, or the portable terminal is subscribed to a different wireless charging service, the charging system prompts the portable terminal to display an offer subscribe to the charging service at least to receive one battery charge from the char Yin system.

11. The system of claim 10, wherein the portable terminal and the charging system communicate via a short range communication.

12. The system of claim 10, wherein the charging system transmits the RF for charging at a different frequency than a frequency in which the charging system and the portable terminal communicate.

13. The system of claim 10, wherein the information associated with charging includes battery information.

14. The system of claim 13, wherein the battery information includes a current storage level or a remaining capacity level.

15. The system of claim 10, wherein the information associated with charging includes information indicating whether or not the portable terminal responding is wirelessly chargeable.

16. The system of claim 10, wherein the information associated with charging includes subscription information regarding a wireless communication service, the subscription information including at least one of information indicating whether the portable terminal has subscribed to a wireless charging service, authentication information related to the wireless charging service, and information about an RF channel used for wireless charging.

17. The system of claim 10, wherein the information associated with charging includes information indicating whether or not an automatic charging function has been activated for the portable terminal.

18. The system of claim 10, wherein the charging system increases the output level of the RF for charging and transmits the RF at the increased output level to a particular portable terminal having a battery power level equal to or lower than the predetermined level.

19. A portable terminal having a wireless charging structure, said portable terminal comprising:
  a wireless transceiver for receiving and transmitting wireless communication;
  an audio processor;
  a controller;
  a wireless charger unit that receives Radio Frequency (RF) for charging the portable terminal;
  a short-range communication unit for receiving and transmitting charging information with a wireless charging system; and
  a display;
  wherein the controller controls the short-range communication unit to transmit and receive information associated with receiving the charging RF received by the wireless charger unit; and wherein the controller controls the display to output a text message prompting a user to subscribe to a particular charging service in a current communicative range with the portable terminal at least to receive one wireless charge of the portable terminal.

20. A portable device having a wireless charging structure, comprising:
  a wireless transceiver for receiving and transmitting wireless communication;
  an audio processor;
  a controller;
  a wireless charger unit that receives Radio Frequency (RF) for charging the portable device;
  a short-range communication unit for receiving and transmitting charging information with a wireless charging system; and
  a display, wherein the controller controls the short-range communication unit to transmit and receive information associated with receiving the charging RF received by the wireless charger unit, and wherein the controller controls the display to indicate there is no subscription to a particular charging service in a current communicative range, and to display a prompt to subscribe to the particular charging service at least to receive one battery charge from the wireless charging system.

* * * * *